United States Patent [19]
Blancett

[11] 3,735,102
[45] May 22, 1973

[54] CLOCK FOR METERS

[76] Inventor: Joe H. Blancett, 4729 Jacksboro Highway, Wichita Falls, Tex.

[22] Filed: June 18, 1971

[21] Appl. No.: 154,342

[52] U.S. Cl. .............................235/94 R, 235/91 R
[51] Int. Cl. ...................................G06m 1/00
[58] Field of Search.............235/94 R, 92 C, 91 R; 58/152 R, 145; 73/206, 229, 230, 231, 83, 121, 103; 346/78, 14 R, 147 R

[56] References Cited

UNITED STATES PATENTS

| 1,489,376 | 4/1924 | Wheeler | 235/92 C |
| 1,861,517 | 6/1932 | Winton | 235/91 R |
| 2,524,299 | 10/1950 | Sutherland | 346/78 |
| 3,059,849 | 10/1962 | Saltzman | 235/91 R |
| 3,093,307 | 6/1963 | Hague et al. | 235/94 R |

Primary Examiner—Richard B. Wilkinson
Assistant Examiner—Stanley A. Wal
Attorney—Pravel, Wilson & Matthews

[57] ABSTRACT

A rotatable shaft extends upwardly into the space between a pair of spaced holding members to rotate a plurality of horizontally and vertically positioned gear means which causes a indicator means to indicate the amount of fluid passing through a meter.

4 Claims, 4 Drawing Figures

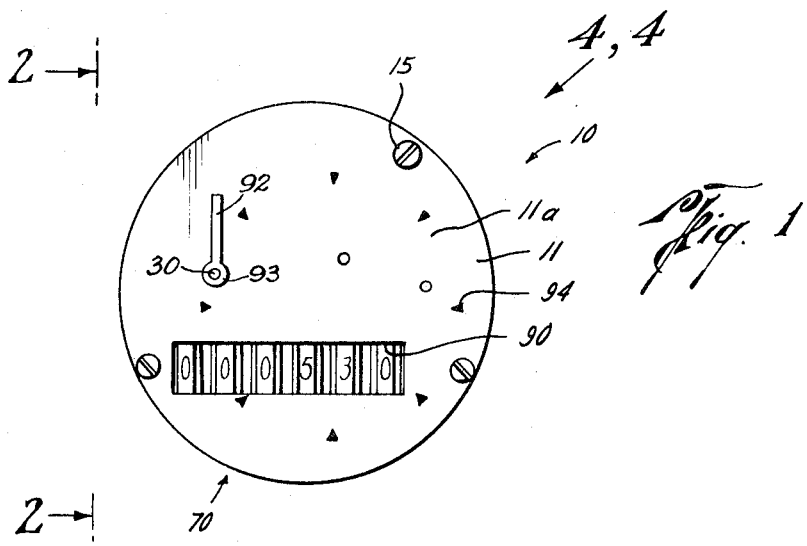
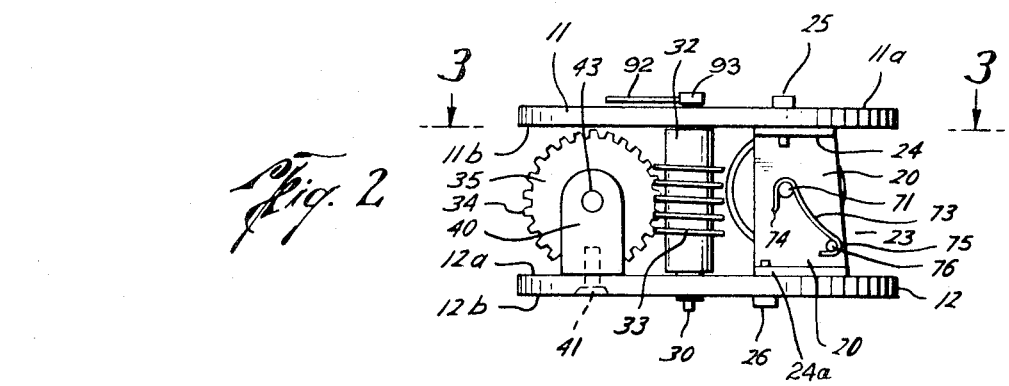
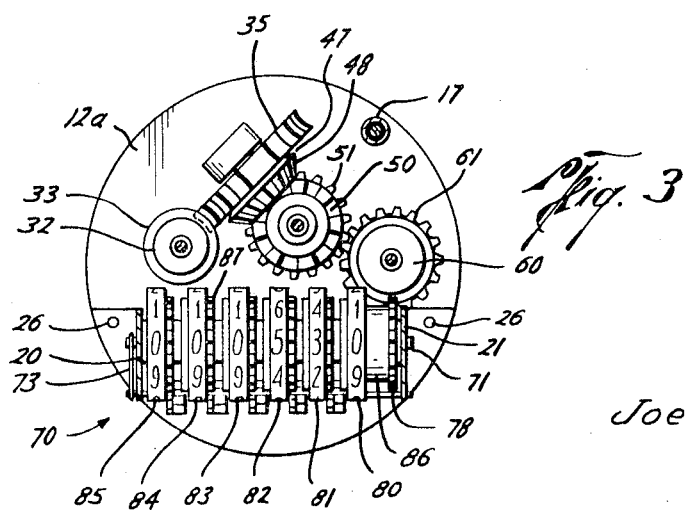

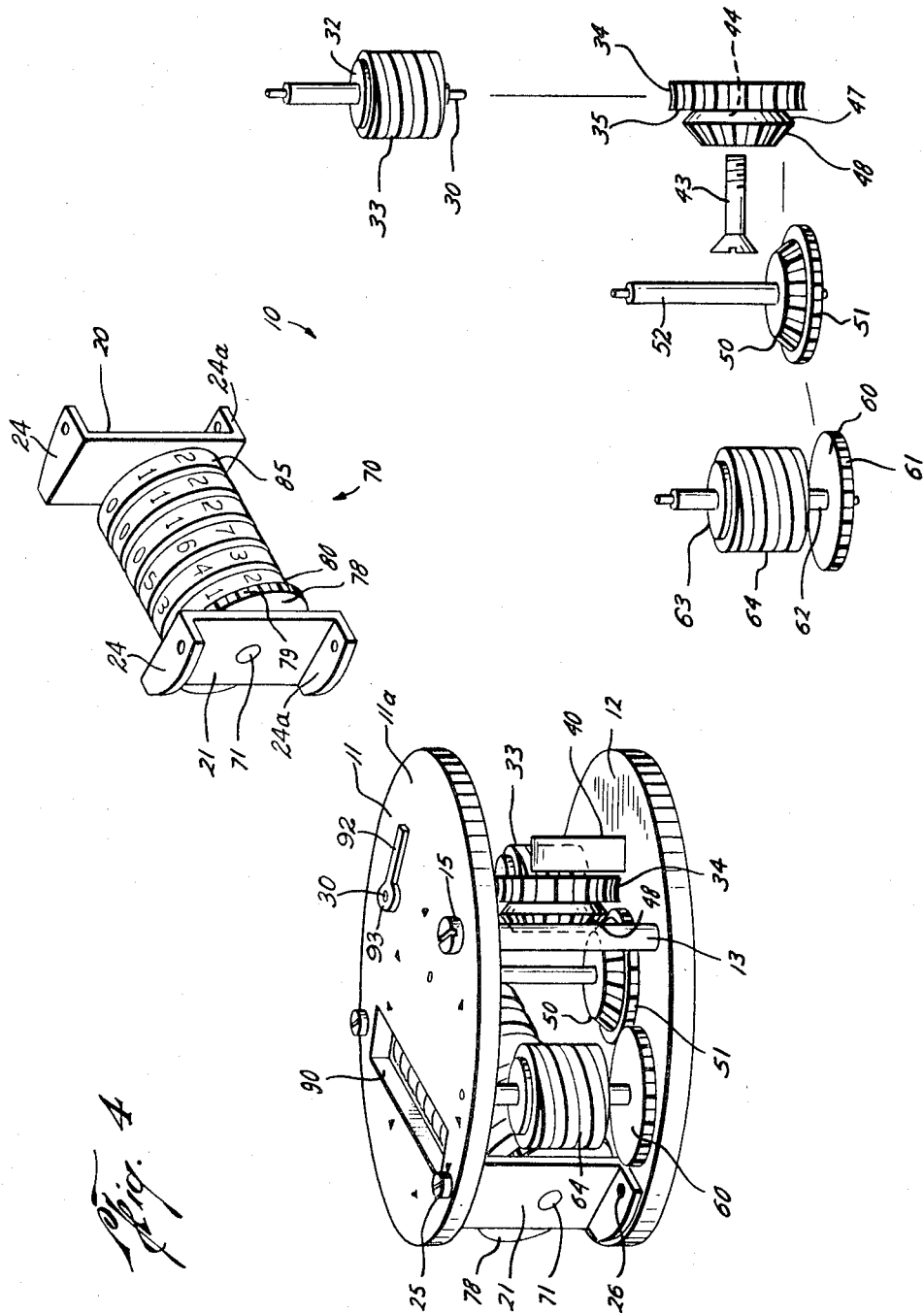

CLOCK FOR METERS

BACKGROUND OF THE INVENTION

1. Field of the Invention

This invention relates to the art of fluid meters more particularly to a new and improved fluid meter.

2. Description of the Prior Art

In the prior art clocks which would accurately measure the rate of fluid flow through meters were difficult to obtain. If there were such clocks then their gear means were so complex that they were very expensive to purchase, expensive to maintain and were easily broken because of many intricate parts.

SUMMARY OF THE INVENTION

Briefly, the present invention relates to a clock for measuring the amount of fluid flow through flow meters and the like including a pair of spaced holding means, a rotatable shaft which rotates in response to fluid flow through the meter extending upwardly through the spaced holding means, a clock face positioned on the outer surface of one of the holding means, a clock hand mounted with rotatable shaft and positioned immediate adjacent the clock face a vertically positioned rotatable gear shaft means mounted with such shaft and rotating in response to the rotation of the shaft, a rotatable drive gear means including vertically extending teeth which intermesh with the gear teeth of the rotatable gear shaft, rotatable gear means having horizontally extending teeth which intermesh with the gear teeth with the vertically positioned gear teeth of said drive gear means and the counting means which rotates in response to movement of said rotatable gear means for accurately measuring the amount of fluid flow through the fluid meter.

It is an object of the present invention to provide a new and improved clock meter for measuring the volume of fluid flow through flow meters.

BRIEF DESCRIPTION OF THE DRAWINGS

FIG. 1 is a top view of an outer surface of a holding means, a clock face, clock hand and counting means;

FIG. 2 is a side view taken along line 2—2 of FIG. 1 illustrating the relationship of spaced holding means relative to a plurality of gear means of the present invention;

FIG. 3 is a top view taken along line 3—3 of FIG. 2 further illustrating the relationship of the gear means of the present invention; and FIG. 4 is an assembly and exploded view illustrating the relationship of each of the gear means of the present invention relative to each other.

DESCRIPTION OF THE PREFERRED EMBODIMENT

As illustrated in FIGS. 1 through 4 the clock meter of the present invention is generally designated by the numeral 10 and includes a pair of spaced holding means 11 and 12 which is this embodiment are illustrated as being circular plates made of metal or other suitable material. It should however be understood that such plates may be in other suitable geometric configurations. Each of the plates 11 and 12 is spaced by a suitable post 13 which extends through the upper holding means 11 and is secured thereto by a suitable screw 15 which is threadedly engaged with threads (not shown) on the inside of the post. As illustrated such threads are flush with the upper surface 11a of the holding means 11. The lower end (not numbered) of the post extends into an opening 17 in the upper surface 12a of the plate 12.

The holding means 11 and 12 are also spaced by a pair of parallel positioned plates 20 and 21 which extend in the space 23 between such holding members 11 and 12. Each of the plates 20 and 21 includes outwardly extending tabs 24 and 24a which extend outwardly transverse from each of the plates 20 and 21, respectively which are positioned immediately adjacent the lower surface 11b of the holding means 11 and the upper surface 12a of the holding means 12 for connection with the holding means 11 and 12 by suitable screw members 25 and 26.

A rotatable shaft 30 extends upwardly through the lower surface 12b of the holding means 12, into the space 23 and through the upper surface 11a of the holding means 11. The rotatable shaft 30 rotates in response to volume of fluid flow through the flow meter and the apparatus for rotating the shaft 30 does not form a part of this invention.

A vertically positioned rotatable gear shaft means 32 is mounted concentrically with said shaft 30 in the space 23. The vertically positioned shaft 32 includes horizontally extending gear teeth 33 which extend outwardly to engage vertically extending transversely positioned gear teeth 34 of a rotatable drive gear means 35.

As illustrated in FIGS. 2, 3 and 4 a support arm 40 extends upwardly from the upper surface 12a of the holding means 12 and is positioned and mounted with such holding means by a suitable screw means 41. A transversely extending screw 43 extends through an opening (FIG. 4) 44 in the drive gear means 35 transversely to the arm 40 to maintain the drive gears teeth 34 positioned vertically relative to the horizontally positioned teeth 33 of the vertical rotatable gear shaft means 32.

The rotatable drive gear means 35 also includes a smaller drive gear means 47 mounted immediately adjacent the vertically positioned wheel 35 for suitable gear reduction as desired. The drive gear or wheel 47 also includes outwardly extending gear teeth 48 which extend outwardly for engagement with a horizontally positioned first rotatable gear means 50 having outwardly extending teeth 51. The horizontally positioned wheel 50 is positioned immediately adjacent the upper surface 12a of the spaced holding means 12 and maintained in such position by suitable rotatable spindle 52 which extends in a space 23 between the holding means 11 and 12 and is mounted to the upper surface 11b of holding means 11 and lower surface (not shown) 12a of holding means 12.

A second rotatable horizontally positioned gear means 60 also includes outwardly extending teeth 61 which intermesh with the teeth 51 of the horizontally positioned wheel 50 as illustrated in FIGS. 3 and 4. The horizontally positioned wheel 60 is similarly positioned immediately adjacent the upper surface 12a of the holding means 12 as mounted with a rotatable spindle 62 which extends between the space 23 and is suitably mounted to the upper and lower surface of the lower surface 11b of the holding means 11 and the upper surface 12a of the holding means 12 in any suitable manner. A vertically positioned continuous wheel 63 is concentrically mounted with said spindle 62 and includes outwardly extending horizontally positioned teeth 64.

A counting means generally designated at 70 and includes a concentrically positioned shaft 71 which is mounted with and extends between each of the plates 20 and 21. As illustrated in FIG. 3 a small portion (not numbered) of the shaft 71 extends outwardly through the plate 20 and is connected by a suitable spring clip 73, as illustrated, which retains the shaft in suitable position by partially encircling the shaft 71 with a curved portion 74 with a spring clip 73. A second curved portion 75 of the clip 23 is mounted with a retainer pin 76 which extends through the plate 21 for retaining the spring clip under tension and in position to prevent removal of the shaft 71.

A suitable gear wheel 78 is mounted concentrically relative to the shaft and includes a plurality of radially outwardly extending gear teeth 79 which intermesh with the gear teeth 64 of the vertically positioned rotatable gear means 63. The counting means 70 also includes a plurality of counting wheels 80, 81, 82, 83, 84, and 85, which move sequentially in response to rotation of the shaft 71. Each of the wheels 80 through 85 is mounted concentrically relative to the shaft and includes suitable gear means 87 spaced between each of said counting wheels 80 through 85.

As illustrated in FIGS. 3 and 4, each of the counting wheels 80 through 85 are impressed thereon with the numerals 1 through 0 and are sequentially triggered such that a complete rotation of wheel 80 from the numeral 1 through 0 will cause rotation of the wheel 81 to the numeral 1, and sequentially thereon. As is well known in the art the gears 87 are fixed and maintained to obtain such result.

As illustrated in FIGS. 1 and 4 a rectangular opening 90 is cut or formed in the holding means 11 such that if it is desired, each of the counting wheels can be viewed to determine the volume of fluid flow through the As illustrated in FIG. 1, the number is 530 units. As also illustrated in FIG. 1 a clock hand 92 is positioned at its stem end 93 concentrically relative to the rotatable shaft 30 which extends upwardly through the holding means 11 such that rotation of the shaft 30 will also cause the clock end 92 to rotate immediately adjacent the upper surface 11a of the holding means 11. As also illustrated in FIG. 1 the upper surface 11a may have impressed thereon suitable indentations or figures 94 to enable such upper surface 11a to function as a suitable clock face.

In the operation of the invention the shaft 30 is rotated in response to volume of fluid flow through a fluid chamber or the like (not shown) which thus causes the horizontally positioned gear means 32 to rotate. Such rotation enables the horizontally positioned gear wheel or gear drive means 35 to rotate. Rotation of such gear drive means 35 in turn imparts rotation to such gear drive means 47 which enables the intermeshed teeth 48 of gear drive means 47 to intermesh with the gear teeth 51 of the horizontally positioned rotatable gear wheel 50. Rotation of the gear wheel 50 imparts rotation to the horizontally positioned gear 60 which in turn imparts rotation to the vertically positioned gear means 64. As vertically positioned gear means 64 rotates, its horizontally outwardly extending gear teeth intermesh with the gear teeth 79 of the vertically positioned gear means 78 mounted with the shaft 71 of the counting means 70. As such gear means 78 rotates, rotation is imparted to the shaft 86 which in turn causes the number wheels 80 through 85 to rotate sequentially as desired depending upon the gear ratio of the gears 87 positioned between each of the wheels 80 to 85.

It should be noted that if desired that the vertically positioned gear wheel 47 may be eliminated if desired that any of the gear ratios of the horizontally and vertically positioned gears relative to each other may be changed as desired to achieve different counting rates or volume measuring rates for counting.

Of course as the shaft 30 rotates the clock hand 92 similarly rotates and in the embodiment illustrated in FIGS. 1 through 4 one complete rotation of the clock hand 92 is synchronized to cause the first number wheel 80 to turn to a next succeeding number from 1 through 0. As such wheel turns to the 0 number, a numeral wheel 81 rotates to the number 1. It should be readily apparent that this process may be repeated several times such that the volume of fluid flow through the flow meter may be measured in hundreds of thousands of units.

The foregoing disclosure and description of the invention are illustrative and explanatory thereof, and various changes in the size, shape, and materials as well as in the details of the illustrated construction may be made without departing from the spirit of the invention.

I claim:

1. In a clock for measuring the amount of fluid that flows through flow meters, the improvement comprising:
   a. spaced holding means, one of said holding means having an outer surface with a slot therein;
   b. rotatable shaft means extending upwardly through said holding means, said shaft means being rotated in response to fluid flow through said meter;
   c. a clock face positioned on said outer surface of said one of said holding means, said clock face having suitable numbers impressed thereon;
   d. clock hand means mounted with said shaft and positioned adjacent said outer surface, said clock hand means rotating in response to said shaft;
   e. rotatable gear shaft means concentrically and vertically mounted with said shaft between said spaced holding means, said gear means including horizontally positioned gear teeth said gear means comprising:
      1. a first rotatable gear means having horizontally extending gear teeth intermeshed with said vertically positioned gear teeth of said gear drive means, said first rotatable gear means teeth intermeshing with said drive gear means teeth adjacent said spaced holding means opposite from said spaced holding means having said outer surface; and
      2. a second rotatable gear means having horizontally extending gear teeth intermeshing with said horizontally extending gear teeth of said first rotatable gear means, said second rotatable gear means and said counting means for driving said counting means as said rotatable gear shaft means rotates said rotatable drive gear means, and said first gear means.
   f. vertically positioned rotatable drive gear means mounted between said spaced holding means, said drive gear means including outwardly extending gear teeth intermeshed with said horizontally positioned teeth of said rotatable gear shaft means;

g. rotatable gear means having outwardly extending gear teeth intermeshed with said teeth of said drive gear means;

h. counting means mounted with said rotatable gear means, said counting means rotating in response to said rotating gear means such that rotation of said clock hand and actuation of said counting means simultaneously occurs to measure volume of fluid flow through the meter.

2. The structure as set forth in claim 1 wherein such counting means includes sequentially numbered rotatable wheels having suitable numerals impressed thereon for measuring up to one hundred thousand units of flow through said flow meter.

3. The structure set forth in claim 1 wherein said counting means is positioned relative to a longitudinal slot formed in said spaced holding means having an outer surface.

4. The structure as set forth in claim 3 wherein said second rotatable gear means includes:

a. a vertically positioned rotatable shaft extending upwardly from said second horizontally positioned gear means; and b. a vertically positioned gear means mounted with said shaft, said vertically positioned gear means having horizontally extending teeth for co-acting with said counting means for driving said counting means.

* * * * *